United States Patent [19]

Lapp et al.

[11] Patent Number: 5,604,087
[45] Date of Patent: Feb. 18, 1997

[54] PROCESS FOR THE PRODUCTION OF SILVER HALIDE EMULSIONS

[75] Inventors: Otto Lapp; Lothar Endres; Klaus Wagner, all of Bergisch Gladbach, Germany

[73] Assignee: AGFA-Gevaert AG, Germany

[21] Appl. No.: 561,172

[22] Filed: Nov. 21, 1995

[30] Foreign Application Priority Data

Dec. 2, 1994 [DE] Germany .................. 44 42 909.6

[51] Int. Cl.$^6$ .................................................. G03C 1/015
[52] U.S. Cl. ........................................... 430/569; 430/567
[58] Field of Search ............................. 430/569, 567

[56] References Cited

U.S. PATENT DOCUMENTS 3,482,982  12/1969  Miyata et al. .................. 430/569

FOREIGN PATENT DOCUMENTS 0563708  10/1993  European Pat. Off. ........ G03C 1/005

OTHER PUBLICATIONS

Science and Technology of Photography, Ed. Karlhienz Keller, pp. 43–53, VCH, New York.

*Primary Examiner*—Mark F. Huff
*Attorney, Agent, or Firm*—Connolly & Hutz

[57] ABSTRACT

A silver halide having at least two halides of differing atomic numbers may successfully be produced with a more uniform halide distribution within certain zones or throughout the entire volume of the individual grain and from grain to grain, if a portion or the entire quantity of the halide of the higher atomic number is dissolved in an aqueous silver salt solution and the resulting solution is introduced at any stage into the emulsion preparation process.

16 Claims, 2 Drawing Sheets

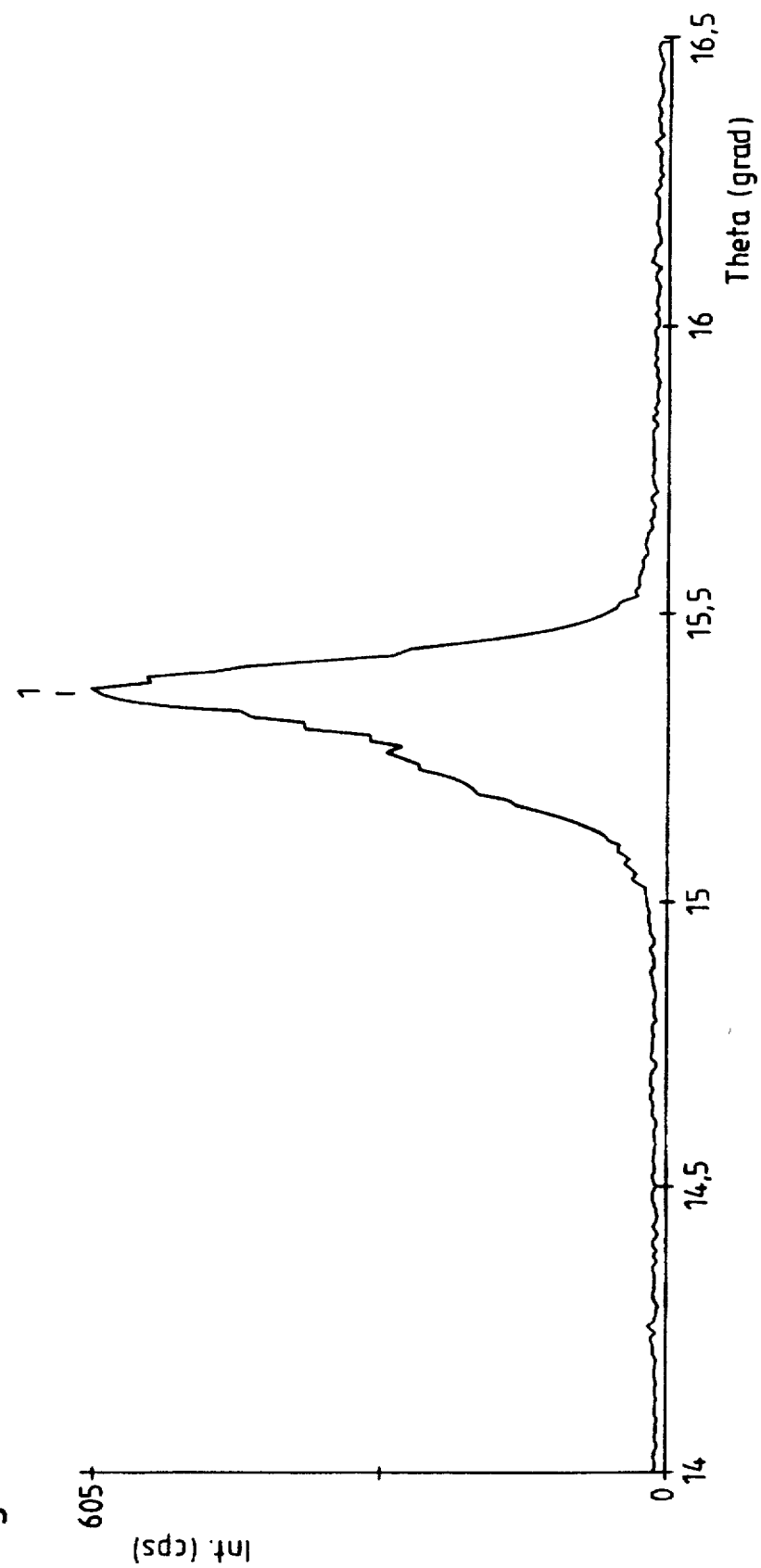

# PROCESS FOR THE PRODUCTION OF SILVER HALIDE EMULSIONS

BACKGROUND OF THE INVENTION

1. Field of the Invention

This invention relates to a novel process for the formation of a light-sensitive silver halide emulsion precipitated by reaction of solutions of halides and a silver salt in the presence of a protective colloid or peptising agent, the emulsion grains consisting of at least two halides of different atomic numbers, which results in a particularly uniform distribution of the halides both within particular zones or throughout the entire volume of the individual grain and from grain to grain, so yielding advantages in sensitivity, fog, gradation, sensitivity to substances inhibiting or accelerating development. These advantageous properties may be used to produce not only improved photographic products but also photographic products which, for a given range of properties, are distinguished by a reduced application of silver halide and reduced quantities of compounds which influence development, for example DIR couplers, DAR couplers.

2. Description of the Prior Art

In the case of mixed silver halides, the desire to arrange the distribution of the different halides both within the individual grain and from grain to grain as uniformly as possible is known from EP 563 708, as improvements in properties are expected from such an arrangement.

The measures which have hitherto been proposed are complicated, technically costly and the results achieved are still inadequate. They are based on chemical and processing measures or combinations of the two. Examples are:

a) pAg-controlled silver halide precipitation, which may be automated and is thus the simplest, but still does not result in the desired uniformity;

b) the use of silver halide micrate emulsions of a predetermined composition, for example pure silver iodide emulsions, the silver halide of which dissolves during the actual precipitation operation and is reprecipitated together with other silver halides;

c) the use of external mixing chambers; and d) currently the most recent stage, the use of organic compounds which release iodide ions as a function of pH.

Methods b) to d) require considerable additional complication and appreciably increase silver halide production costs without achieving more than slight improvements.

Micrate emulsions are here taken to be particularly finely precipitated silver halide emulsions with an average diameter of a sphere of an equal volume to the grain of less than 0.1 μm.

SUMMARY OF THE INVENTION

The object of the invention was to provide a process which, by simple means, allows the formation of mixed silver halides with a more uniform halide distribution both within the individual grain and from grain to grain.

This object was achieved by dissolving a portion or the entire quantity of the halide having the higher atomic number in an aqueous silver salt solution and introducing the resulting solution at any stage into the emulsion preparation process, particularly reacting this solution with an aqueous halide solution containing at least one halide with a lower atomic number than the first stated halide. The process according to the invention may be used mutatis mutandis depending upon the desired halide composition to produce emulsions having a layered grain structure for individual or all crystal zones.

BRIEF DESCRIPTION OF THE DRAWING

FIG. 2 shows X-ray diffractograms of a comparison emulsion.

DESCRIPTION OF THE PREFERRED EMBODIMENTS

Figure 1:
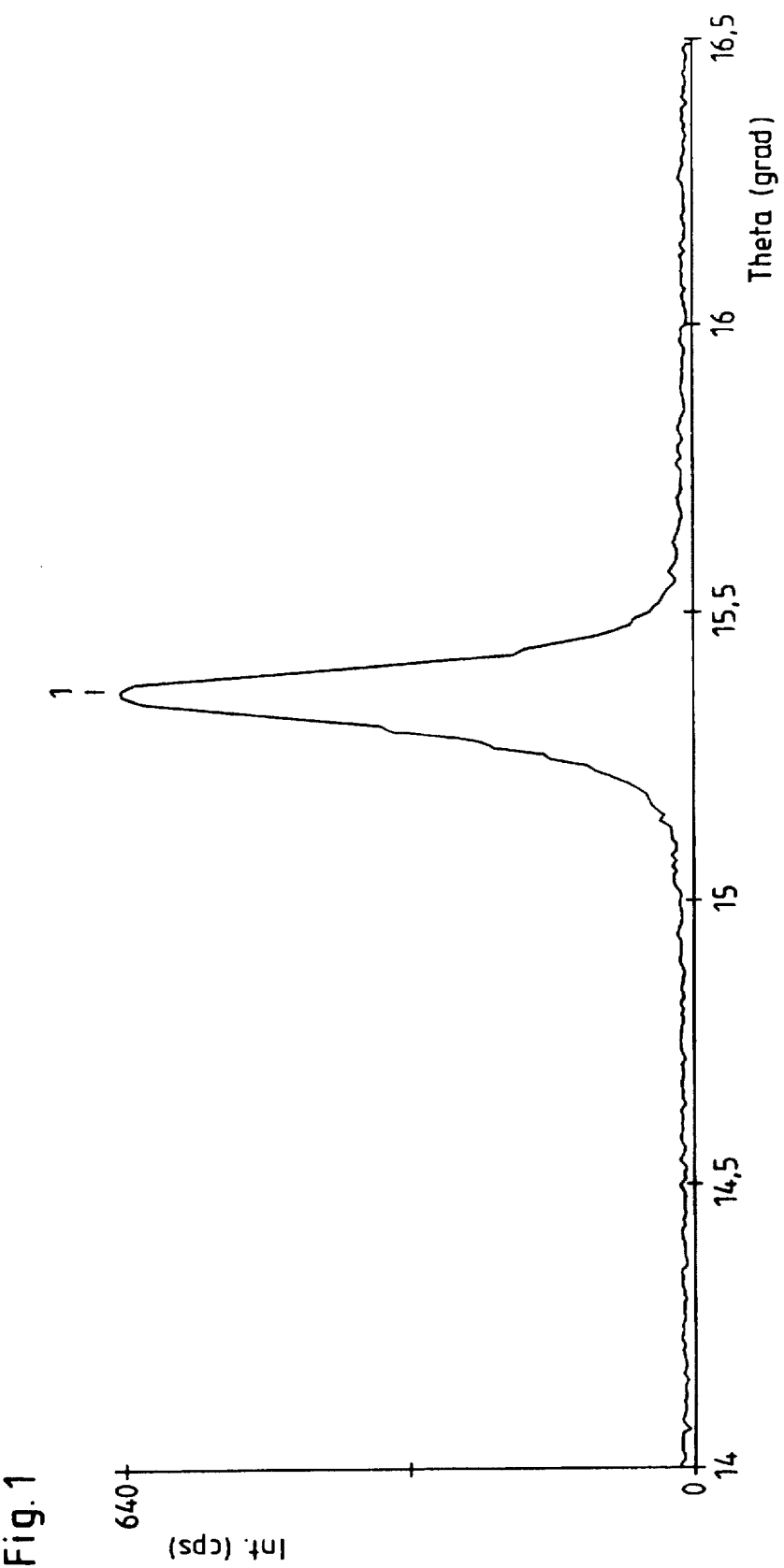
FIG. 1 shows X-ray diffractograms of an emulsion produced according to the invention.

The invention relates to a process for the formation of a light-sensitive silver halide emulsion comprising precipitating by reacting solutions of halides and a silver salt in the presence of a protective colloid or peptising agent, the emulsion grains consisting of at least two halides of different atomic numbers, wherein a portion or the entire quantity of the halide of the higher atomic number is dissolved in an aqueous silver salt solution and the resulting solution is introduced at any stage into the emulsion preparation process.

In a preferred embodiment the halide containing silver salt solution is a) added simultaneously with an aqueous halide solution by a double jet method or b) added separately at any stage of the emulsion preparation process.

Mixed silver halides which may be considered are silver chloride-bromide, silver chloride-iodide, silver chloride-bromide-iodide, but preferably silver bromide-iodide. In this latter case, in accordance with the above instructions, iodide, for example as potassium iodide, is dissolved in an aqueous silver nitrate solution and reacted with an aqueous solution containing a soluble bromide, for example potassium bromide, or a soluble bromide and a soluble iodide, for example a mixture of potassium bromide and potassium iodide.

The silver nitrate solution is used in the most concentrated form possible, as the solubility of halides in silver nitrate solutions increases with the concentration thereof. For example, up to $10^{-2}$ molar silver iodide, which is formed on adding potassium iodide to a silver nitrate solution, dissolve in a 1 molar silver nitrate solution. These methods are limited by the solubility of the silver salt, in particular of the silver nitrate, in water and the solubility of the desired silver halide in the concentrated (at most saturated) silver salt solution. The values are known from the literature.

The use of highly concentrated silver salt solutions has hitherto been avoided in photographic emulsion practice, as homogeneous mixing of the reactants, which is always desired, is rendered much more difficult as the concentration thereof increases. It is thus all the more surprising that, despite the elevated concentrations, very homogeneous silver halide distributions may be achieved in the emulsion crystals using the process according to the invention.

The silver halide emulsions obtained according to the invention may be used as they are for photographic purposes or as precipitation nuclei for the production of complicated silver halide emulsions with a layered grain structure.

The process according to the invention may moreover be used for the production of silver halide micrate emulsions (Lippmann emulsions), for example in an external mixing chamber, which, in a subsequent stage, are redissolved onto a given silver halide crystal population or recrystallised therein. The proportion of complexly dissolved silver halide in the silver salt solution may in each case be selected up to the temperature-dependent maximum solubility value.

The process according to the invention is in particular suitable for the production of silver bromide-iodide emulsions. Silver nitrate is here preferably used as the soluble silver salt.

The concentration of silver nitrate in the aqueous solution is preferably at least 3 mol/l, preferably at least 5 mol/l. The temperature of the silver salt solution containing halide is preferably at least 50° C., particularly preferably 70° to 95° C.

Preferably, at the given silver salt concentration and temperature, at least 50 wt. % of the possible maximum quantity of halide (iodide or bromide) is complexly dissolved in the silver salt solution.

The reaction of the silver salt solution with the aqueous halide solution is preferably performed using the double jet process. It is also advantageous initially to introduce the silver salt solution containing halide into the precipitation vessel and to add the aqueous halide solution thereto, so precluding the risk of individual components of the hot, highly-concentrated silver salt solution containing halide crystallising out in inadequately heated feed lines.

The figures show X-ray diffractograms of an emulsion produced according to the invention (FIG. 1) and of a comparison emulsion (FIG. 2). To this end, the (200) reflection of the $CuK_{\alpha 1}$ radiation in Guinier arrangement is measured and the intensity in cps (counts per second) is plotted against the angle of reflection theta in °. The narrower the measured signal, the more homogeneously is the silver iodide incorporated into the AgBrI mixed crystal.

Details of emulsion production are stated in the examples.

EXAMPLES

Example 1 (comparison emulsion)

100 ml of a 7 molar aqueous $AgNO_3$ solution (80° C.) and 200 ml of an aqueous halide solution (65° C.) containing 0.64 mol of $NH_4Br$ and 0.073 mol of KI were simultaneously introduced via double jet at a $U_{AG}$ value of −70 mV (against a calomel electrode/3 m KCl) in 8 minutes with vigorous stirring at 70° C. into 500 ml of a 3.4 wt. % aqueous gelatine solution (inert bone gelatine). An Ag(Br,I) emulsion is produced with 10.5 mol. % iodide and an average grain diameter of 0.64 μm (iodide distribution in FIG. 2).

Example 2 (invention)

The same method is used as in example 1, but with the difference that all the iodide is introduced into the silver nitrate solution before the beginning of the double jet.

An Ag(Br,I) emulsion is produced with 10.5 mol. % iodide and an average grain diameter of 0.60 μm.

It is clearly apparent from the X-ray diffractograms that the process according to the invention gives rise to a distinctly more homogeneous silver iodide distribution within the emulsion crystal (iodide distribution in FIG. 1).

We claim:

1. Process for the formation of a light-sensitive silver halide emulsion which contains emulsion grains comprising precipitating by reacting solutions of halides and a silver salt in the presence of a protective colloid or peptising agent, the emulsion grains consisting of at least two halides of different atomic numbers, wherein a portion or all of the halide of the highest atomic number is dissolved in an aqueous silver salt solution forming an aqueous resulting solution and the resulting solution is introduced at any stage into the formulation of the light-sensitive silver halide emulsion process.

2. Process according to claim 1, wherein the aqueous resulting solution is a) added simultaneously with an aqueous halide solution by a double jet method or b) added separately at any stage of the emulsion process.

3. Process according to claim 1, wherein the halide of the highest atomic number is iodide.

4. The process according to claim 3, wherein said iodide is mixed with silver chloride.

5. The process according to claim 3, wherein said iodide is mixed with silver bromide.

6. The process according to claim 3, wherein said iodide is mixed with silver chloride-bromide.

7. Process according to claim 1, wherein the halide of the highest atomic number is bromide.

8. The process according to claim 7, wherein said bromide is mixed with silver chloride.

9. Process according to claim 1, wherein the silver salt is silver nitrate and its concentration in the aqueous resulting solution may be selected up to a particular temperature-dependent maximum value of solubility.

10. Process according to claim 1, wherein the aqueous resulting solution has a silver salt concentration of ≧3 mol/l.

11. The process according to claim 10, wherein the silver salt concentration of the aqueous resulting solution is at least 5 mol/l.

12. Process according to claim 1, wherein the temperature of the aqueous resulting solution is ≧50° C.

13. The process according to claim 12, wherein the temperature of the aqueous resulting solution is 70°–95° C.

14. Process according to claim 1, wherein in order to perform the reaction, the aqueous resulting solution is initially introduced into a precipitation vessel and an aqueous halide solution is added thereto.

15. Photographic material having at least one emulsion formed according to claim 1.

16. The process as claimed in claim 1, wherein the emulsion grains consist of uniformly distributed halides of different atomic numbers.

\* \* \* \* \*